United States Patent [19]
Johnson

[11] 4,428,436
[45] Jan. 31, 1984

[54] SEED TRENCH DIGGER WITH INDEXING STRUCTURE

[76] Inventor: Russell D. Johnson, 2308 W. 14th Ave., Spokane, Wash. 99204

[21] Appl. No.: 467,771

[22] Filed: Feb. 18, 1983

[51] Int. Cl.³ .............................................. A01B 1/02
[52] U.S. Cl. .................................... 172/372; 172/430
[58] Field of Search .............. 172/126, 371, 372, 373, 172/374, 375, 378, 379, 430; 111/25, 26, 27, 28, 29, 30, 31, 32, 33, 89, 94, 99

[56] References Cited

U.S. PATENT DOCUMENTS

| | | | |
|---|---|---|---|
| 645,702 | 3/1900 | Arlaud | 172/378 |
| 879,291 | 2/1908 | Meinen | 172/372 |
| 1,339,222 | 5/1920 | Randall | 172/373 |
| 1,414,087 | 4/1922 | Kenny | 172/373 X |
| 2,061,542 | 11/1936 | Appenzeller | 172/373 |
| 4,218,981 | 8/1980 | Kelly | 111/89 |

FOREIGN PATENT DOCUMENTS

| | | | |
|---|---|---|---|
| 76765 | 6/1919 | Austria | 172/375 |
| 65130 | 8/1945 | Denmark | 111/99 |
| 230033 | 12/1943 | Switzerland | 172/430 |
| 6985 | of 1909 | United Kingdom | 172/373 |
| 611343 | 10/1948 | United Kingdom | 172/374 |
| 671192 | 4/1952 | United Kingdom | 111/99 |

*Primary Examiner*—Richard T. Stouffer
*Attorney, Agent, or Firm*—Keith S. Bergman

[57] ABSTRACT

A manually manipulable tool movable along a linear index to create a trench for planting seeds at a spaced distance from the index. The depth of the trench and its spacing from an index are adjustably variable. The device may be indexed from either side and may create an additional indexing indicia at a spaced distance from the seed trench created.

4 Claims, 5 Drawing Figures

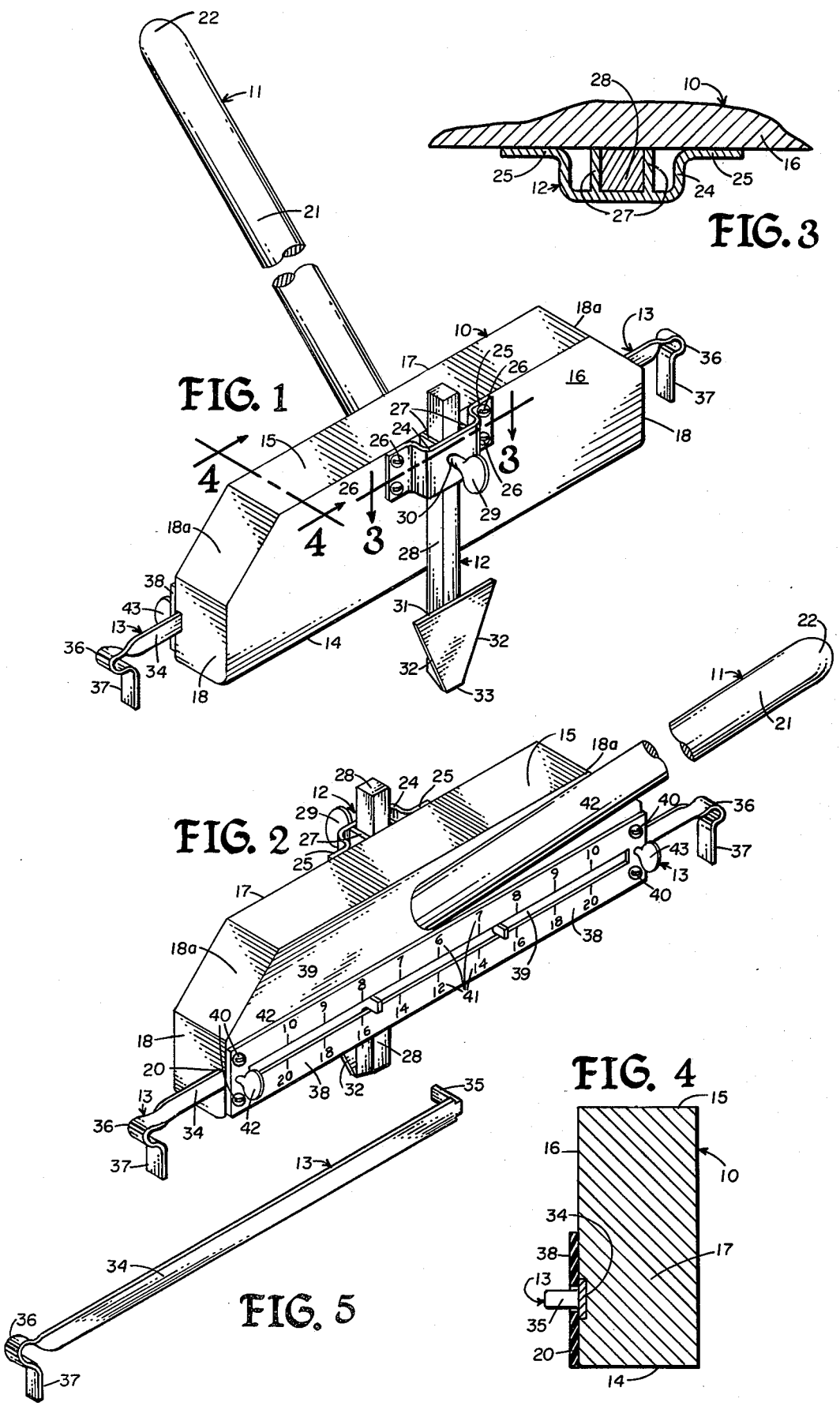

SEED TRENCH DIGGER WITH INDEXING STRUCTURE

BACKGROUND OF INVENTION

Related Applications

There are no applications related hereto heretofore filed in this or any foreign country.

Field of Invention

My invention relates generally to horticultural hand tools to create a seed trench and more particularly to such a tool that creates a trench of adjustable depth at a spaced distance from an indexing indicia.

Descriptions of Prior Art

In the planting of seeds it is generally desired for both aesthetic and horticultural purposes that the seeds should be established in a lineal array of one sort or another. It is also generally desirable, and sometimes necessary, that seeds be established in a somewhat prepared seed bed to provide finely granulated soil thereabout and covering of the seeds to an appropriate depth to allow germination. Many seeds are quite sensitive to seed bed parameters, and particularly depth of soil coverage, to such an extent that their germination and subsequent growth during the seedling period is quite directly related to those seed bed parameters. These conditions have long been recognized in horticultural arts and responsively thereto many and various planting devices have heretofore become known at least partially fulfill the needs. The instant invention provides a new and novel member of this general class of device.

Seed bed preparing devices may be divided into two general groups based upon their function, the first class providing devices that establish a relatively small bed, for one or a few seeds to be placed in immediate adjacency, with each bed spaced from other beds and a second class of devices that are moved over and through the earth to create a seed bed of some substantial length wherein a substantial number of seeds may be placed in linear adjacency. The first class of device would be represented by planters for corn, beans or potatoes in hills or the like and the second group would be represented by planters to create elongate linear rows in a garden. Devices of each of these classes provide structure that is essentially related to their functions and are generally, therefore, quite readily distinguishable from each other on a structural as well as a functional basis. It is the second class of seed bed preparing devices that encompasses the instant invention.

Generally when seed beds are established in elongate rows, it is desired that the rows be lineal, parallel and substantially equally spaced. Undoubtedly aesthetics play some part in creating this desire, but the particular arrayal also tends to provide opptimum horticultural conditions for the growth and development of the plants involved. Seed rows are generally established with reference to some sort of linear indicia such as the periphery of a parcel, a pre-established physical structure such as a tight string extending between two supports or some pre-existing topographical features such as a previously established row or a contour line. My invention is particularly adapted to function with such indicia by providing adjustably extensible spacing guides extending laterally from either side to aid in aligning the device during its operation.

My invention further provides a ditch forming spade configured as a truncated equilateral triangle to create a seed bed at the bottom of a trench having similar cross-sectional shape. The trench forming spade depends from the medial portion of the body of my tool in an adjustable fashion so that a seed bed may be created by any particularly desired depth ranging through the limits of normal seed coverage depths. The trench forming spade is symmetrically positioned relative to the body of the tool to aid in maintaining the tool's lineal motion and to produce a berm of excavated dirt symmetrically on both sides of the trench being excavated, in distinguishment from prior art devices which commonly did not provide a symmetrically shaped excavating spade and commonly did not symmetrically position it. My tool is provided with an angularly extending handle to aid its manipulation through the earth by a standing user.

Various individual features of my invention have heretofore been known per se in one fashion or another and my invention therefore does not reside in any individual feature as such, but rather only in the synergesic combination of all features to form the entire tool as herein specified and claimed.

SUMMARY OF INVENTION

My invention generally provides a traversely elongate body supported on an angularly disposed handle to allow manipulation at ground level by a standing manipulator. The body provides similar, opposed, spacing gauges adjustably extending laterally from each side of the body. The medial portion of the body carries an adjustably depending trench forming spade configured as a truncated equilateral triangle, the truncated lower portion depending at a spaced distance therebelow.

In providing such a device it is:

A principal object of my invention to provide a tool that will create a seed trench at an adjustably spaced distance from an indexing indicia having some linear extent.

A further object of my invention to create such a device that will provide a seed trench of adjustable depth that has the cross-sectional shape of a truncated triangle with the truncated portion lowermost.

A further object of my invention to provide such a device that has a trench forming spade that is symmetrically carried by the body of the tool and moved symmetrically through the earth to aid the potentiality of the tool's forming a linear trench.

A still further object of my invention to provide such a tool that will create a seed trench at a spaced distance from indexing indicia on either side of its body.

A still further object of my invention to provide such a tool that has an appurtenant elongate handle to allow operation by a standing operator.

A still further object of my invention to provide such a device that is of new and novel design, of rugged and durable nature, of simple and economic manufacture and otherwise well suited to the uses and purposes for which it is intended.

Other and further objects of my invention will appear from the following specification and drawings which form a part hereof. In carrying out the objects of my invention, however, it is to be understood that its essential features are susceptible of change in design and structural arrangement with only one preferred and practical embodiment being illustrated in the accompanying drawings as is required.

BRIEF DESCRIPTION OF DRAWINGS

In the accompanying drawings which form a part hereof and wherein like numbers of reference refer to similar parts throughout:

FIG. 1 is an isometric surface view of the front of my invention showing its various parts, their configuration and relationship.

FIG. 2 is an isometric surface view of the back of my invention showing its parts from this aspect.

FIG. 3 is a partial, cutaway horizontal cross-sectional view through the spade adjustment and fastening portion of my invention taken on the line 3—3 on FIG. 1, in the direction indicated by the arrows thereon.

FIG. 4 is a vertical cross-sectional view of the body of my invention, showing particularly the mounting of the spacer arms thereon, taken on the line 4—4 on FIG. 1 in the direction indicated by the arrows thereon.

FIG. 5 is a surface isometric view of one of the spacing arms of my invention showing the details of its construction and configuration.

DESCRIPTION OF THE PREFERRED EMBODIMENT

My invention generally provides transversely elongate body 10 angularly depending from handle 11 and supporting in its medial portion depending spade member 12 and similar laterally extending spacing members 13.

Body 10 provides a rigid, elongate element defined by parallel planar top 14 and bottom 15, similar opposed front 16 and back 17 and ends 18 having the upper corners truncated to form angled surfaces 18a. The cross-section of the body member as shown in FIG. 4 is rectilinear.

Back 17 defines in its upper, medial portion angularly disposed handle hole 19 so positioned that a handle carried therein forms an included angle of approximately sixty degrees with the vertical when the body be in normal vertical position. If it be desired that the handle be rigidly attached to the body, as shown, this hole may be smooth sided to allow attachment by wedging, adhesion and the like. This method of attachment is not essential though and if it be desired that the handle be releasably attached it may provide some co-operative fastening element such as threads or it may be provided with an ancillary resiliently deformable snap-type fastener.

The lower portion of body back 17 defines transversely extending spacer channel 20, of rectilinear shape, extending laterally across the back at a spaced distance inwardly from its communication with bottom 14, as illustrated particularly in FIGS. 2 and 4. This spacer channel is configured and dimensioned to receive the body of the spacer elements in a slidably comformable fit.

The body element must be formed of some rigid, reasonably durable material such as wood which is preferred because of its low cost and easy manufacturing potential. Obviously, however, other similar materials such as metal and especially plastic may serve the purposes of my invention, if not so well.

Handle 11 comprises a rigid elongate cylinder 21 having rounded protruding end 22. The opposite end 23 that communicates within handle hole 19 of body 10 in the case illustrated is cylindrical and attached to the body by means of swedging and adhesion. If desired, however, end 23 might be threaded (not shown) or provided with some ancillary fastening structure as previously described. This handle, again, is formed of some rigid, reasonably durable material, preferably wood, though materials of similar physical characteristics such as molded plastic may fulfill the purposes of my handle.

Spade member provides 'U' shaped bracket 24 having opposed laterally extending fastening flanges 25, which are mechanically joined to the upper medial part of front 16 of the body by plural headed screws 26 extending through holes (not shown) in fastening flanges 25 and into fastening communication with body 10. Two parallel, opposed alignment septums 27 extend from the inner surface of bracket face 24a toward or to front 16 of the body to define a channel to receive and align spade shank 28. The spade shank is an elongate element that may slidably move in a vertical direction in the spade shank channel defined by bracket 24. It is releasably positioned relative to the bracket by thumb screw 29 which is threadedly engaged in hole 30 extending through bracket 24 to allow the thumb screw to be turned into contact with the spade shank to positionally maintain it by friction.

The lower portion of the spade shank carries flat trench forming spade 31 which ontologically is a truncated triangle that geometrically constitutes a trapezoid having longer normally horizontal top 31, similar angled sides 32 and shorter, parallel bottom 33. The spade is configured substantially as illustrated in FIG. 1 with symmetry about a medial, vertical line co-planar with the vertical plane of symmetry of the tool's parts. The lateral dimension of spade shank 28 preferably is not greater than the length of shorter bottom 33 of the spade so that the spade, when moved through the earth, will do the actual trench forming rather than the spade shank. If desired, though not shown, the spade shank might be provided with some indexing inditia to show the amount of its projection beneath the lower portion of bottom 14 of the tool body 10, to thusly indicate the depth of a formed trench.

Preferably all parts of spade member 12 are formed of metal to provide appropriate strength and durability. They may, however, obviously be formed from other materials of appropriate rigidity, strength and durability.

Indexing member 13 provides two similar indexing arms that would be the mirror images of each other, each having elongate body portion 34 with a recilinear cross-section as illustrated. Relatively short manipulating tabs 35 are formed at the inner end of each body to extend perpendicularly to the wider portion of the body. The longer cross-sectional dimension of the tabs is somewhat less than the same dimension of the indexing arm body to allow mounting of the indexing arm as hereinafter specified. The outer end of each indexing arm body is twisted in a skewed fashion to form partially open indexing loop 36 with its axis extending in a forward-rearward direction and depending indexing arm 37 extendingdownwardly a distance so that its lowermost portion is substantially co-planar with bottom 14 of body 10 when the indexing arm be mounted on the body, all as illustrated especially in FIG. 5 of the drawings. The cross-sectional configuration and dimensioning of indexing arm body 34 are substantially the same as those same characteristics of indexing arm channel 20 defined in the forward portion of body 10 so that the spacer arm may be carried for slidable motion within that channel as illustrated especially in the cross-sectional view of FIG. 4.

The indexing arms are maintained within channel 20 by relatively thin face plate 38 defining elongate medial slot 39 to allow passage of indexing arm tab 35. Slot 39 is slightly less in vertical dimension than the vertical dimension of body 34 of the indexing arm so as to maintain that arm within channel 20, but yet allow the slidable motion of the indexing arm tab 35 within the channel. The face plate is positionally maintained on face 16 of body 10 by plural screws 40 passing through holes (not shown) in the face plate and into mechanical joinder with the body. Preferably the face plate has the same lateral dimension as the lower portion of front 16 of body 10 and extends from the line of communication of front and bottom of body 10 to a point somewhat below the communication of handle 11 with the body, all as illustrated in FIG. 2. The face plate may be provided with indexing indicia 41 to show arm extension relative to the body and particularly to show the distance between either indexing loop 36 or arm 37 and the trench forming spade element.

Similar thumb screw holes 42 are provided in each medial end part of face plate 38 to threadedly receive thumb screws 43 which pass therethrough to engage the front surface of body 34 of the indexing arm to frictionally maintain each indexing arm at desired positions.

Preferably all elements of the indexing member, except the face plate, are formed of metal to provide appropriate rigidity and durability. I prefer to form the face plate of transparent plastic material because of transparency, low cost and ease of manufacture though this element also might be formed of other rigid material, if desired.

Having thusly described the structure of my invention its operation may be understood.

Firstly, a tool is formed and assembled according to the foregoing specification and as is illustrated particularly in FIGS. 1 and 2 of the drawings. The projection of the spade element beneath bottom 14 of body 10 will determine the depth of a row to be formed by the device. This depth is adjusted by loosening thumb screw 29, manually moving the spade element to the appropriate depth and then tightening the thumb screw against spade shank 28 to frictionally engage the elements and thus releasably position them relative to each other. The normal range of seed planting depths for flower and vegetable seeds commonly encountered varies from one-fourth inch to four inches, so spade shank 28 should have appropriate length to allow at least this amount of adjustment.

The indexing arms are adjusted by loosening thumb screws 43 and manually moving the arms in a lateral direction relative to body 10 to create an appropriate spacing from an indexing indicia. The thumb screws are then tightened again to frictionally engage and releasably maintain the indexing arms in the determined position.

In this condition the tool is ready for use. Some indexing indicia, commonly a cord or wire stretched tautly between two posts supported in the earth, is established at a spaced distance from the row desired to be formed. The tool is then manually established with either an indexing loop 36 or indexing arm 37 immediately adjacent the indexing indicia. The tool body 10 is then forced downwardly so that the spade element enters the earth and bottom 14 of the body is resting upon the surface of the earth thereunder. In this condition the tool is then moved in a direction parallel to the indexing indicia (not shown) and in so doing the spade element will form a trench having a cross-sectional shape and depth substantially the same as those same characteristics of the spade element. In moving the tool it may be either pushed or pulled as is desired.

The term front or forward as hereinbefore used have contemplated a pushing operation of my tool though pulling is also effective in forming a trench. If the total be pushed the spade element will tend to form a berm on the sides of the seed trench which may require some further adjustment of the depth of the spade to create a seed bed at the ultimate depth, since the ultimate depth of the seed bed will approximate the depth of the spade less the depth of the berm. The tool body may be manipulated to maintain it upon the surface of the earth adjacent the trench being formed rather than on the berm, but if this be done some of the berm material will generally be forced into the trench and may cause its refilling to a substantial degree. If the tool be moved by pulling, in the direction of the handle, these problems are not encountered.

After one row is established the indexing arm that was not initially adjacent an indexing indicia will create a mark in the earth to define the position of the next row to be formed and the tool may be merely moved in accordance with the tracing of this indexing arm which when accomplished will create another spaced tracing for the next succeeding row.

After rows are created the trench digging spade may be removed, or move upwardly so that it does not project below bottom 14 off the body 10, and the tool then used in a fashion similar to a rake to cover the seeded rows. The solid body, in fact, oftentimes creates a smoother and more uniform seed bed than a rake and does not tend to excavate seeds from a seeded row as the trench of a rake may do.

The foregoing description of my invention is necessarily of a detailed nature so that a specific embodiment of it might be set forth as required but it is to be understood that various modifications of detail, rearrangement and multiplication of parts might be resorted to without departing from its spirit, essence or scope.

Having thusly described my invention, what I desire to protect by Letters Patent, and

What I claim is:

1. A tool for forming a seed trench at a spaced distance from an indexing indicia of some lineal extent comprising, in combination:
   an elongate, rigid body having a substantially planar bottom and at least two opposed vertical sides;
   an elongate handle extending angularly from the medial part of a first one of said vertical sides of said body with an obtuse included angle therebetween;
   at least one indexing member providing an elongate body slidably extensible horizontally outwardly from at least one of said vertical sides of the tool body in a direction generally parallel to that side with means to aid in manual manipulation thereof, means to follow some indexing indicia and means of releasably positioning the indexing element relative the body; and
   a spade member, carried on the second vertical tool body side including a bracket mechanically communicating with the body and vertically adjustably supporting an elongate spade shank carrying a truncated triangular spade in its lowermost portion and means for vertically adjustably positioning said spade below the bottom of said tool body.

2. The invention of claim 1 further characterized by said at least one indexing member comprising opposed indexing members extending laterally from the ends of the one vertical side of the tool body.

3. The invention of claim 1 further characterized by the body of the indexing member including an indexing tab and being slidably carried in a channel extending laterally across the first vertical surface of the tool body, said indexing member being maintained in said channel by a sheet-like element, having an elongate slot to allow motion of the indexing tab therethrough.

4. A tool to aid the formation of a seed trench at a spaced distance from some elongate indexing indicia comprising, in combination:

a transversely elongate rigid tool body having a planar bottom and some vertical extension with two opposed elongate vertical faces, an elongate, rigid handle communicating at an obtuse included angle with the medial part of the first elongate vertical face of the tool body;

opposed indexing members, each comprising an elongate indexing body having a projecting index tab to aid manual manipulation at one end and an indexing loop and indexing arm at the other end, said indexing body slidably carried within a channel defined transversely in the first vertical face of the tool body, said indexing members being maintained in the tool body channel by a planar element adjacent the first vertical face and extending over a portion thereof, each of the indexing members extending horizontally outwardly from the first vertical face with indexing loops and arms lateralmost, and being adjustably positionable in lateral extension in a direction generally parallel to said first vertical face; and a spade member, carried by the second vertical face of the tool body, including a bracket mechanically connected to the body in a medial position the bracket carrying for vertical motion an elongate spade shank which carries in its lower portion a spade element having a generally triangular configuration, said bracket having associated means to adjustably position the spade shank with the spade element depending below the bottom of the tool body.

* * * * *